United States Patent [19]

Kunzmann et al.

[11] Patent Number: 4,647,206
[45] Date of Patent: Mar. 3, 1987

[54] MULTI-COORDINATE MEASURING MACHINE

[75] Inventors: Horst Kunzmann, Brunswick; Karl Schepperle, Oberkochen; Gerhard Trieb, Konigsbronn, all of Fed. Rep. of Germany

[73] Assignee: Carl-Zeiss-Stiftung, Oberkochen, Fed. Rep. of Germany

[21] Appl. No.: 651,592

[22] Filed: Sep. 18, 1984

[30] Foreign Application Priority Data

Sep. 23, 1983 [DE] Fed. Rep. of Germany ....... 3334460

[51] Int. Cl.[4] ............................................ G01B 11/02
[52] U.S. Cl. ................................................. 356/358
[58] Field of Search .......................... 356/358; 250/227; 350/96.33

[56] References Cited

U.S. PATENT DOCUMENTS

| | | | |
|---|---|---|---|
| 3,692,413 | 9/1972 | Marcy et al. | 356/358 |
| 4,153,370 | 5/1979 | Corey, III | 356/358 |
| 4,459,024 | 7/1984 | Gergely | 250/227 |
| 4,516,858 | 5/1985 | Gelbwachs | 250/227 |

FOREIGN PATENT DOCUMENTS 1373645  11/1974  United Kingdom ................ 356/358

OTHER PUBLICATIONS

Eickhoff, "Stress-Induced Single-Polarization Single Mode Fiber" *Optics Letters*, vol. 7, #12, Dec. 1982, pp. 629–631.

*Primary Examiner*—Vincent P. McGraw
*Attorney, Agent, or Firm*—Hopgood, Calimafde, Kalil, Blaustein & Judlowe

[57] ABSTRACT

The invention contemplates a multi-coordinate measuring machine with interferometric detection of the path of displacement in each of the measurement axes.

Each measurement axis is provided with at least one interferometer head which consists of a beam splitter, reference mirror and photoelectric detector. The interferometer heads are supplied by a monomode fiber from a single stationary laser generator.

4 Claims, 3 Drawing Figures

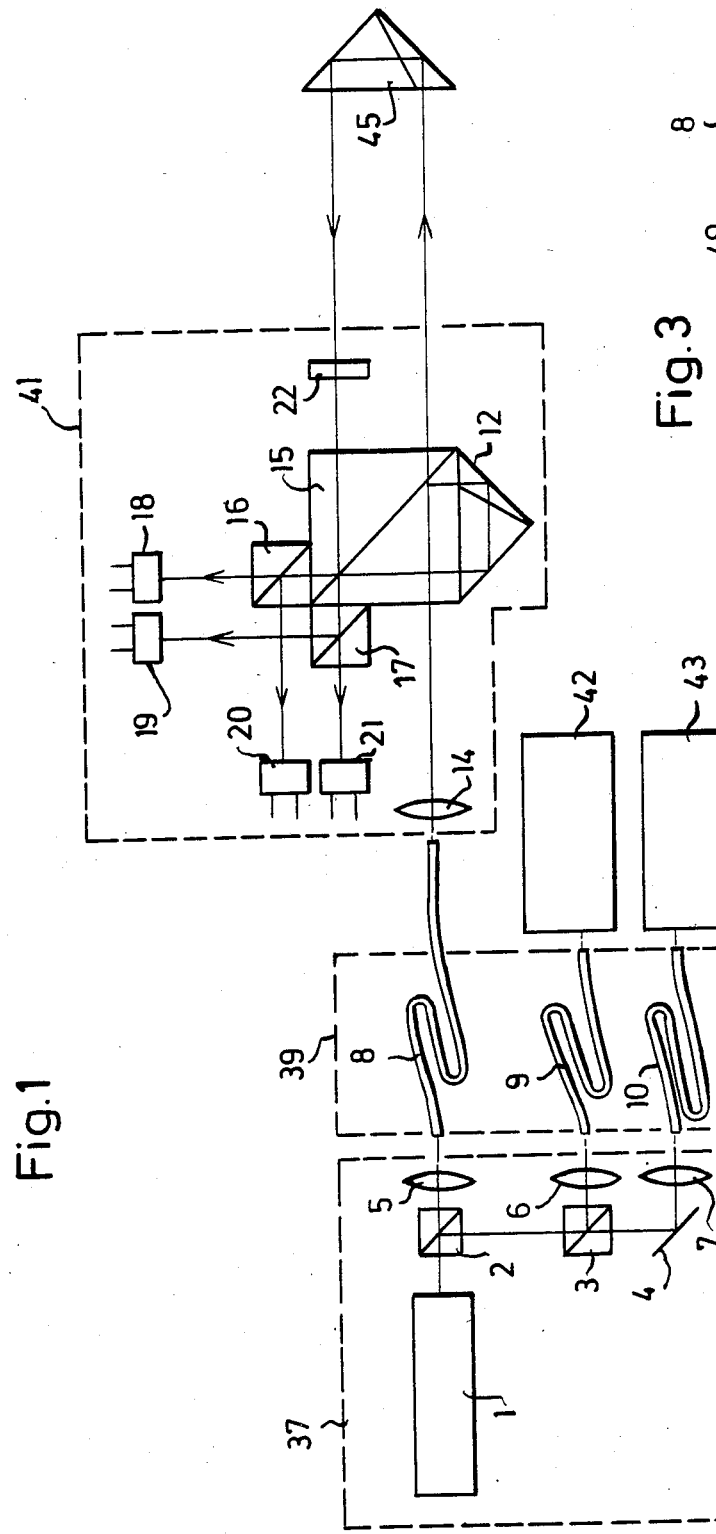
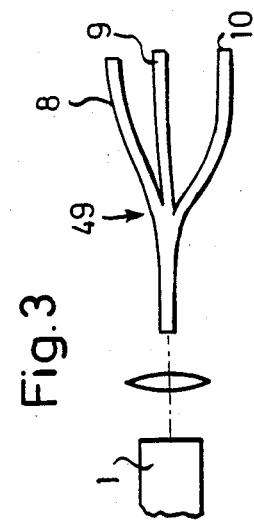

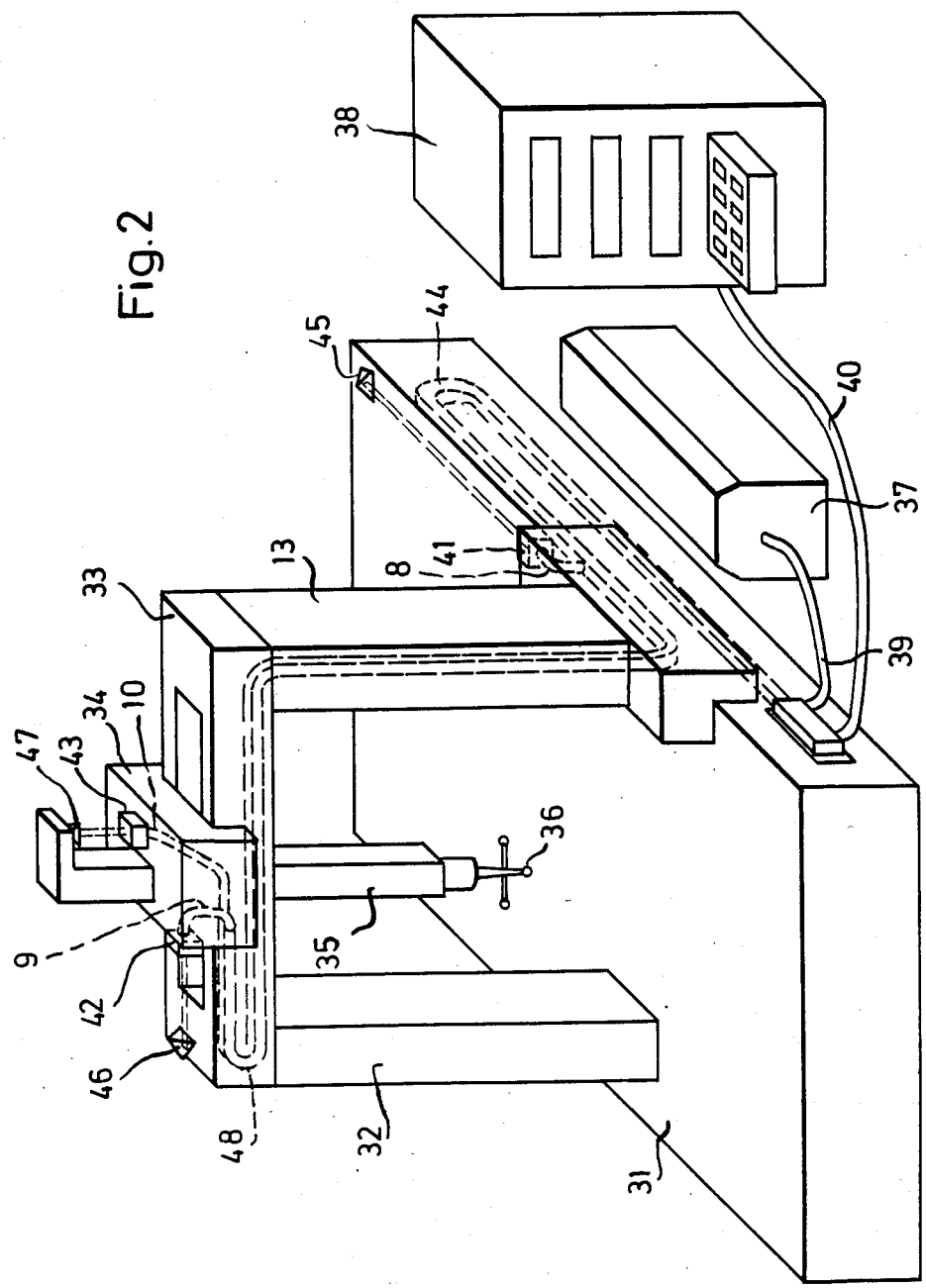

MULTI-COORDINATE MEASURING MACHINE

BACKGROUND OF THE INVENTION

The invention relates to a multi-coordinate measuring machine with interferometric detection of the path of displacement in the respective measurement axes.

As a rule, such machines have three separate laser interferometers developed on the respective displacement-measurement axes X, Y and Z, each interferometer consisting of a laser, interferometer optics and photoelectric detectors for counting the lines or rings of the interference pattern. For example, a machine with such construction is described in published International Patent Application No. WO 81/02627. That machine has the disadvantage of relatively high cost, attributable to three separate laser generators which are incorporated into movable parts of the machine.

From West German C-2,109,954, it is already known to integrate the three axes of a processing machine into a single interferometric measuring system by sequentially performing each of the three displacement paths of measurement, one after another. The disadvantage of this solution is that to measure a given path of movement, the machine is limited to motion in only one axis at a time, while motion in the other two axes must remain stationary.

West German A1-3,201,007 describes an interferometric measuring machine in which measurement beams for the three displacement axes are produced, by beam splitting and reflection, from a single source of radiation. However, difficulties arise in correctly aligning the laser beam from a single source of radiation for supply to the interferometers of the individual measurement axes, since the interferometers are frequently at a great distance from each other, and vibrations, tilting of the movable machine parts, etc. interfere with transmission of the laser beam. To overcome these difficulties, the optical-mechanical design of the transmission channels is necessarily characterized by relatively great expense. Thus, a large number of carefully machined special prisms or mirrors is necessary for folding the beam, and it is also necessary to screen the transmission channel from dirt and outside light.

BRIEF STATEMENT OF THE INVENTION

The object of the present invention is to reduce cost and to provide a measuring machine of the simplest possible construction for interferometric detection of a displacement path along plural measurement axes.

The invention achieves this object by providing a measuring machine wherein, for each measurement axis, at least one interferometer head is provided, wherein the head consists of beam-splitter, reference-mirror and photoelectric-detector components, and wherein the interferometer heads are supplied, via flexible light guides, from at least one laser generator at any suitable location of fixed but non-aligned orientation with respect to the measurement axes.

Admittedly Nos., EP-A-64 789, WO-A-82/04310 and WO-A-82/04311, as well as U.S. Pat. No. 4,153,370, disclose integration of fiber optics in interferometric length-measuring systems. However, in these cases, each glass fiber forms part of the interferometric measurement path and, therefore, a multiple coupling and uncoupling of the measurement beam to and from the fibers is necessary, with resulting loss in the intensity of delivered laser radiation.

The advantage of the present invention resides in the fact that all three interferometers in the respective measurement axes of a multi-coordinate measuring machine can be supplied from a single laser generator with a minimum of expense. Even machines which are already provided with traditional photoelectric grid measurement systems can be subsequently easily converted to interferometric detection of the measurement values, since light guides for supplying the interferometer systems can be included in existing electric cable harnesses of the machine. The laser itself can be set up as far as desired from the measurement axes of the machine, for instance in the bed of the machine, where it is not susceptible to mechanical disturbance.

It is advantageous to use as light guides monomode fibers of elliptical cross-section since the polarized direction of light conducted in these fibers is insensitive to mechanical disturbance. Such suitable fibers are available on the market and are described, for example, in U.S. Pat. No. 4,307,938 or DE-C2-2,735,312.

DETAILED DESCRIPTION OF THE INVENTION

The invention will be illustratively described in detail, in conjunction with the accompanying drawings, in which:

FIG. 1 is a sketch of the optical system used in a measuring machine of the invention;

FIG. 2 is a perspective view of a measuring machine provided with the optical system of FIG. 1; and FIG. 3 is a diagram of a slightly modified component in the optical system of FIG. 1.

In the optical system of FIG. 1, the useful beam of a laser generator 1 is split into three individual beams of equal intensity, by two beam splitters 2 and 3. A fully reflecting mirror 4 serves to reflect the beam which passes through beam splitter 3.

Beam splitters 2 and 3 and the fully reflecting mirror 4 are followed by three optical systems 5, 6 and 7 which couple the three individual beams into corresponding light guides 8, 9 and 10. These optical systems 5, 6 and 7 may, for instance, consist of individual lenses, and the focal point of each lens is at the polished transmission end of the corresponding one of the light guides 8, 9 and 10.

Each of the three light guides 8, 9 and 10 supplies one of three interferometric length-measuring systems 41, 42 and 43 with radiation from the laser 1.

Of course, it is also possible to effect requisite splitting of the beam by means of a fiber-optical coupler 49, as shown in FIG. 3.

In the just-described embodiment, the three interferometers 41, 42 and 43 are of exactly the same construction. For simplicity, however, only the interferometer system 41 supplied by the light guide 8 has been shown in detail.

System 41 consists of a beam-splitter cube 15 which splits the beam coming from the end of light guide 8, whence the beam is collimated by a lens 14 into a measurement beam and a reference beam. The two beams are reflected, spaced from and parallel to each other by triple mirrors 12 and 45, respectively. The triple mirror 12 which is associated with the reference beam is cemented directly onto the beam splitter 15 and a so-called λ/4-plate 22 is arranged in the measurement-beam path.

Polarizing beam splitters 16 and 17 are arranged at the respective two outlets of the interferometer. These beam splitters 16 and 17 operate upon the two individual beams produced after interference on the cement layer (Kittschicht) of cube 15, by splitting each beam into its linearly polarized components. Behind the outlets of the two beam splitters 16 and 17 are two photoelectric detectors 18, 19, 20 and 21 respectively, by means of which the interference lines are counted.

Since the described interferometer requires that a predetermined direction be maintained for polarization of the incident beam, monomode fibers with elliptical-core cross section have been used for the light guides 8, 9 and 10.

FIG. 2 shows, by way of example, how the optical system described above is integrated into the measurement axes of a three-coordinate measuring machine. The measuring machine shown is of the portal type, consisting of a base plate 31, as of granite, on which the portal slides on air bearings; the portal consists of two columns 13 and 32 and a transverse beam 33 arranged thereon. A slide 34, which is displaceable perpendicular to the direction of displacement of the portal, is guided on transverse beam 33, and in its turn it supports a vertically displaceable measuring spindle 35 having a probe head 36.

Each measurement axis of the measuring machine has an associated interferometric length-measuring system. The interferometer head 41, in combination with reflector 45, measures longitudinal displacement of the portal, while interferometer head 42 measures transverse displacement of a cross slide 34 with respect to a reflector 46, and the third interferometer head 43 measures vertical displacement of a reflector 47 which is carried by a vertically displaceable measurement spindle 35.

The power supply for the drives of the measurement machine, the electronic system for its control, and the electronic system for processing and display of measurement results are arranged in a control cabinet 38, connected by a cable 40 to the measurement machine. Cable 40 extends into a cable harness in the machine, which, with the use of flexibly reinforced bends 44 and 48, is supported and guided by inner contours of involved movable machine parts. The same cable harness will be understood also to include light guides 8, 9 and 10, which are combined to form a glass fiber cable 39, and these light guides individually supply the respective interferometer heads 41, 42 and 43. The same cable harness will also be understood to accommodate the flexible electrical wiring (not shown) which serves to connect the respective detectors to suitable signalprocessing means within cabinet 38. The laser generator 1, as well as the optical systems 2 to 7 for beamsplitting and coupling to the light conductors 8 to 10, are contained in a housing 37.

In the embodiment which has been described, each measurement axis contains only a single interferometer for the measurement of the involved displacement path, but it will be understood that it is readily possible for laser generator 1 to supply several interferometers (even of different optical construction) for each measurement axis via corresponding additional light guides if, for instance, a turning or tilting of the involved machine part is also to be detected by means of such additional interferometers.

What is claimed is:

1. A multi-coordinate measuring machine with interferometric detection of the path of displacement in each of a plurality of measurement axes, characterized by the fact that for each of the plural measurement axes a complete interferometer head is carried by said machine and is dedicated solely to measurement along its one of the plural axes; said interferometer head in each case comprising a first beam splitter with two outlet beams produced after interference at the beam-splitting layer of said first beam splitter, a separate polarizing beam splitter disposed at each of said outlets to split each of said outlet beams into its two linearly polarized components, a separate photoelectric detector carried with said interfereometer head at each of the two outlets of each of said polarizing beam splitters, whereby to enable electric-signal data for counting of interference lines; and a polarized beam supply comprising a single fixedly mounted laser generator, and a separate flexible light guide coupling the output of said laser generator to each said interferometer head, each said light guide being a monomode fiber of polarization-maintaining type.

2. A multi-coordinate measuring machine according to claim 1, characterized by the fact that a separate optical system is positioned to couple each beam-split fraction to a different one of said light guides (8, 9, 10), each said optical system focusing individual laser-generated rays on the transmission end of a different one of said light guides (8, 9, 10).

3. A multi-coordinate measuring machine according to claim 1, characterized by the fact that the light guides (8, 9, 10) are, at least in part, combined with the signal or supply lines of the detectors (18 to 21) to form a common cable harness.

4. In a multiple-coordinate measuring machine comprising a plurality of displaceable parts wherein the directions of displacement are orthogonally related and establish an orthogonally related set of different measurement axes, there being one complete interferometric length-measuring head and mirror carried by said machine and adapted to each measuring axis; each said interferometric head comprising a first beam splitter with two outlet beams produced ater interference at the beam-splitting layer of said first beam splitter, a separate polarizing beam splitter disposed at each of said outlet beams to split each of said outlet beams into its two linearly polarized components, a separate photoelectric detector carried with said interferometer head at each of the two outlets of each of said polarizing beam splitters, whereby to enable electric-signal data for counting of interference lines; and a polarized beam supply for each of said interferometer heads, said beam supply comprising a single fixedly mounted laser generator, beam-splitting means for developing from said single laser generator a plurality of derived sources of polarized beam supply, a separate flexible light guide coupling each derived source to a different one of said interferometer heads, each said light guide being a monomode fiber of polarization type, and flexible wiring connected to said photoelectric detectors and combined with said light guides in a common cable harness.

* * * * *